United States Patent
Gobetz et al.

(10) Patent No.: US 10,905,112 B2
(45) Date of Patent: Feb. 2, 2021

(54) ANIMAL MONITORING STATION

(71) Applicant: James Madison University, Harrisonburg, VA (US)

(72) Inventors: Katrina E Gobetz, Harrisonburg, VA (US); Bryan Cage, McGaheysville, VA (US)

(73) Assignee: JAMES MADISON UNIVERSITY, Harrisonburg, VA (US)

(*) Notice: Subject to any disclaimer, the term of this patent is extended or adjusted under 35 U.S.C. 154(b) by 0 days.

(21) Appl. No.: 16/266,073

(22) Filed: Feb. 3, 2019

(65) Prior Publication Data

US 2019/0246625 A1    Aug. 15, 2019

Related U.S. Application Data

(60) Provisional application No. 62/631,241, filed on Feb. 15, 2018.

(51) Int. Cl.
| | |
|---|---|
| *A01M 31/00* | (2006.01) |
| *G06T 7/60* | (2017.01) |
| *A01K 5/02* | (2006.01) |
| *H04N 5/225* | (2006.01) |

(52) U.S. Cl.
CPC .......... *A01M 31/002* (2013.01); *A01K 5/02* (2013.01); *G06T 7/60* (2013.01); *H04N 5/2253* (2013.01)

(58) Field of Classification Search
CPC ....... H04N 5/2253; A01M 31/002; G06T 7/60
See application file for complete search history.

(56) References Cited

U.S. PATENT DOCUMENTS

| | | | | |
|---|---|---|---|---|
| 4,745,472 A | * | 5/1988 | Hayes | G01B 11/022 348/141 |
| 9,534,958 B1 | * | 1/2017 | Lhamon | G01J 5/0025 |
| 2002/0062205 A1 | * | 5/2002 | Roberts | A01M 1/2011 702/188 |
| 2012/0180731 A1 | * | 7/2012 | Garner | A01K 1/031 119/417 |
| 2017/0202204 A1 | * | 7/2017 | Baxter | A01M 23/08 |
| 2017/0360026 A1 | * | 12/2017 | Zirkle | H04Q 9/00 |

* cited by examiner

*Primary Examiner* — Tsion B Owens
(74) *Attorney, Agent, or Firm* — Leveque IP Law, P.C.

(57) ABSTRACT

An animal monitoring station comprises a housing, a bait receptacle, a camera, a scale, and a grid. The housing comprises a chamber; and at least one port configured to allow an animal: free ingress to the chamber; and free egress to the chamber. The bait receptacle is disposed inside the chamber. The camera is disposed in the chamber. The scale is disposed in a field of view of the camera. A grid is disposed in the field of view.

19 Claims, 13 Drawing Sheets

ANIMAL MONITORING STATION

CROSS-REFERENCE TO RELATED APPLICATIONS

This application claims the benefit of U.S. Provisional Application No. 62/631,241, filed Feb. 15, 2018, which is hereby incorporated by reference in its entirety.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DESCRIPTION OF EXAMPLE EMBODIMENTS

Presently disclosed embodiments comprise an animal monitoring station. Embodiments may be employed to remotely collect data on animals such as, for example, mammals.

Live-trapping of animals may be challenging due to, for example: an inability to control environmental factors in a trap, an inability to timely visit a trap, and an inability to observe and measure an animal in a stress free state. Live-trapping of very small mammals, such as pygmy shrews, may introduce additional challenges due to high Basal Metabolic Rate (BMR), Field Metabolic Rate (FMR), and energy expenditures of these species. Sherman and Longworth traps require vigilant monitoring; yet even with careful methods, escape and mortality may lead to unsatisfactory data.

Embodiments of an animal monitoring station may weigh, measure, and photograph visiting animals that are free to enter and exit at will. Embodiments obviate the need for frequent trap checking or handling of, for example, small, often fragile mammals. Data may be collected using a combination of devices such as, for example: camera(s), microphone(s), scales(s), sensor(s), actuators, and processing devices(s). Measurements may be taken in response to a scale (for example, a force plate) being activated. The example force plate may record a voltage that is translated to representation of weight (for example, grams, pounds, and/or the like). Embodiments may be mechanically configured to protect electronics from condensation. The electronics may be configured to determining weight ranges of visitors and to identify individual visitors. Some embodiments may employ a data storage device to save monitored data. Some embodiments may employ a wireless communications device to communicate monitored data directly to a field-monitoring data device.

Figure 1:
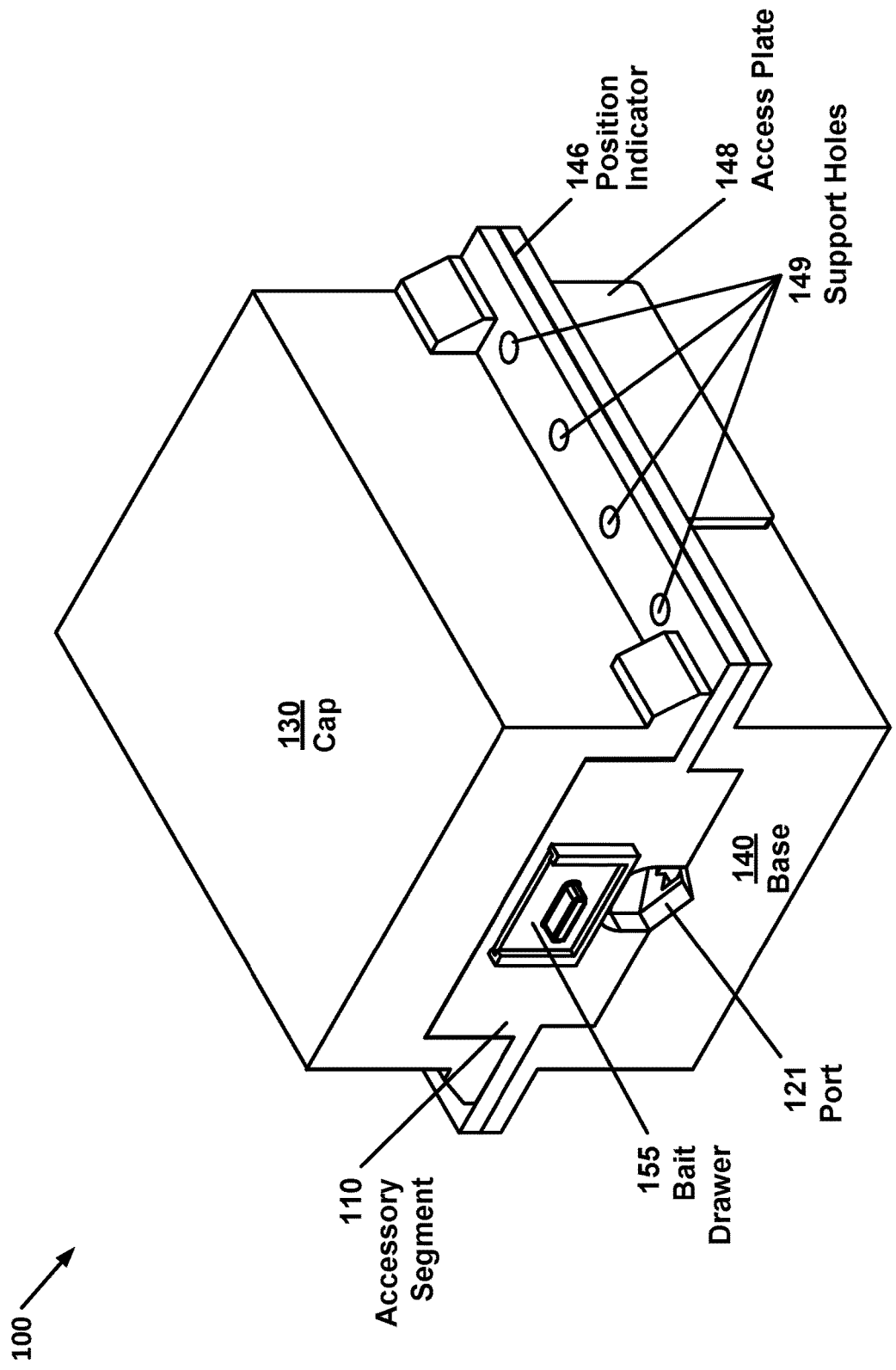
FIG. 1 is an upper perspective view of an example animal monitoring station as per an aspect of an embodiment of the present disclosure.

FIG. 1 is an upper perspective view of an example animal monitoring station as per an aspect of an embodiment of the present disclosure. As illustrated, an embodiment may comprise: a housing 100. The housing 100 may comprise, for example, a base segment 140, an accessory segment 110, and/or a cap 130.

A removable bait drawer 155 may provide access to a bait receptacle (not shown). Other embodiments may provide alternative bait receptacles. A bait receptacle may comprise a structure for providing bait inside the animal monitoring station. A bait receptacle may hold food such as, for example, seeds, nuts, suet, sugar, meat, combinations thereof, and/or the like.

An animal monitoring station may comprise one or more internal chambers. According to various embodiments, access plate(s) such as access plate 148, may provide access to internal chamber(s) of the housing. Access plate 148 may be configured to provide access to an observation chamber. An access plate 148 may provide access to an internal accessory chamber configured to hold electronics such as, for example, scale electronics, processing devices, wireless devices, batteries, power supplies, combinations thereof, and/or the like.

According to various embodiments, indicator structure(s) (e.g. 146) may be employed to set the housing 100 in a desired location. For example, a plate indicator (e.g. 146) may comprise a ground plate indicator configured to indicate a position where port(s) (e.g. 121) are at ground level. Support holes (e.g. 149) may be employed to, for example, to stake the housing 100 to the ground, to raise the housing 100 above the ground using legs (not shown), mount the housing 100 to an external object, and/or the like. The height of the housing 100 may depend upon the type of animal the housing 100 is configured to attract. A plate indicator 146 may provide a structure to assist placing a trap in a position relative to water, branches, natural structures, non-natural structures, combinations thereof, and/or the like.

Figure 2:
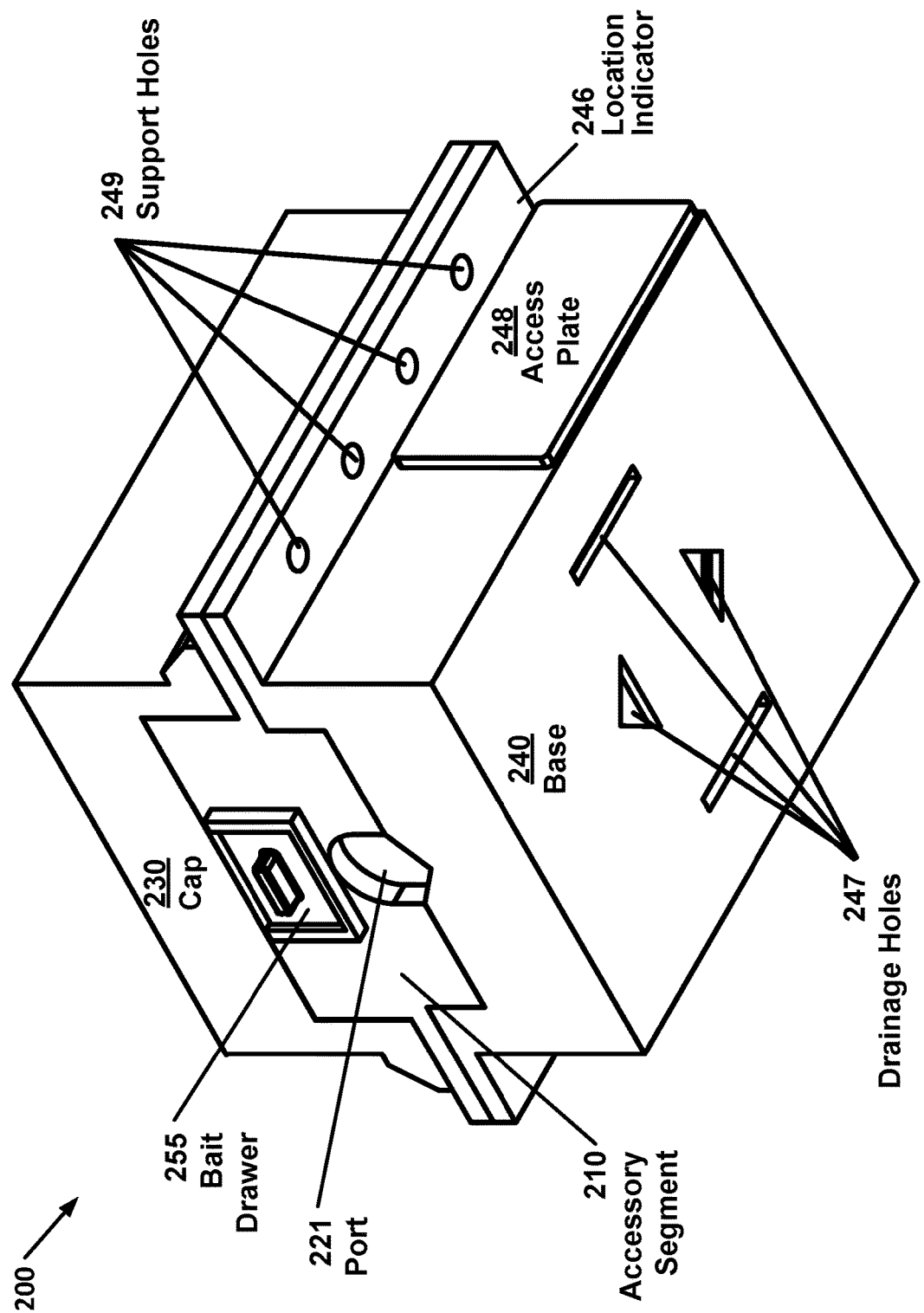
FIG. 2 is a lower perspective view of an example animal monitoring station as per an aspect of an embodiment of the present disclosure.

FIG. 2 is a lower perspective view of an example animal monitoring station as per an aspect of an embodiment of the present disclosure. The animal monitoring station may comprise a housing 200. Housing 200 may comprise a base segment (e.g. 240), an accessory segment (e.g. 210), and/or a cap (e.g. 230). According to an example embodiment, a removable bait drawer (e.g. 255) may provide access to a bait receptacle (not shown). An access plate (e.g. 248) may provide access to internal chamber(s) (e.g. an observation chamber) of the housing 200. The internal chambers may be configured to hold electronics such as, for example, scale(s), battery(ies), camera(s), light(s), motion sensor(s), combinations thereof, and/or the like. Plate indicator(s) (e.g. 246) may be employed to set the housing in a desired location, such as for example, relative to the ground so that port(s) (e.g. 221) are accessible to target animal(s). Support holes (e.g. 249) may be employed to, for example, stake the housing 200 to the ground, raise the housing above the ground using legs (not shown), attach the housing 200 to an external object or structure, and/or the like. Drainage holes (e.g. 247) may be mechanically configured to allow liquid to drain from internal chambers of the housing 200.

Figure 3:
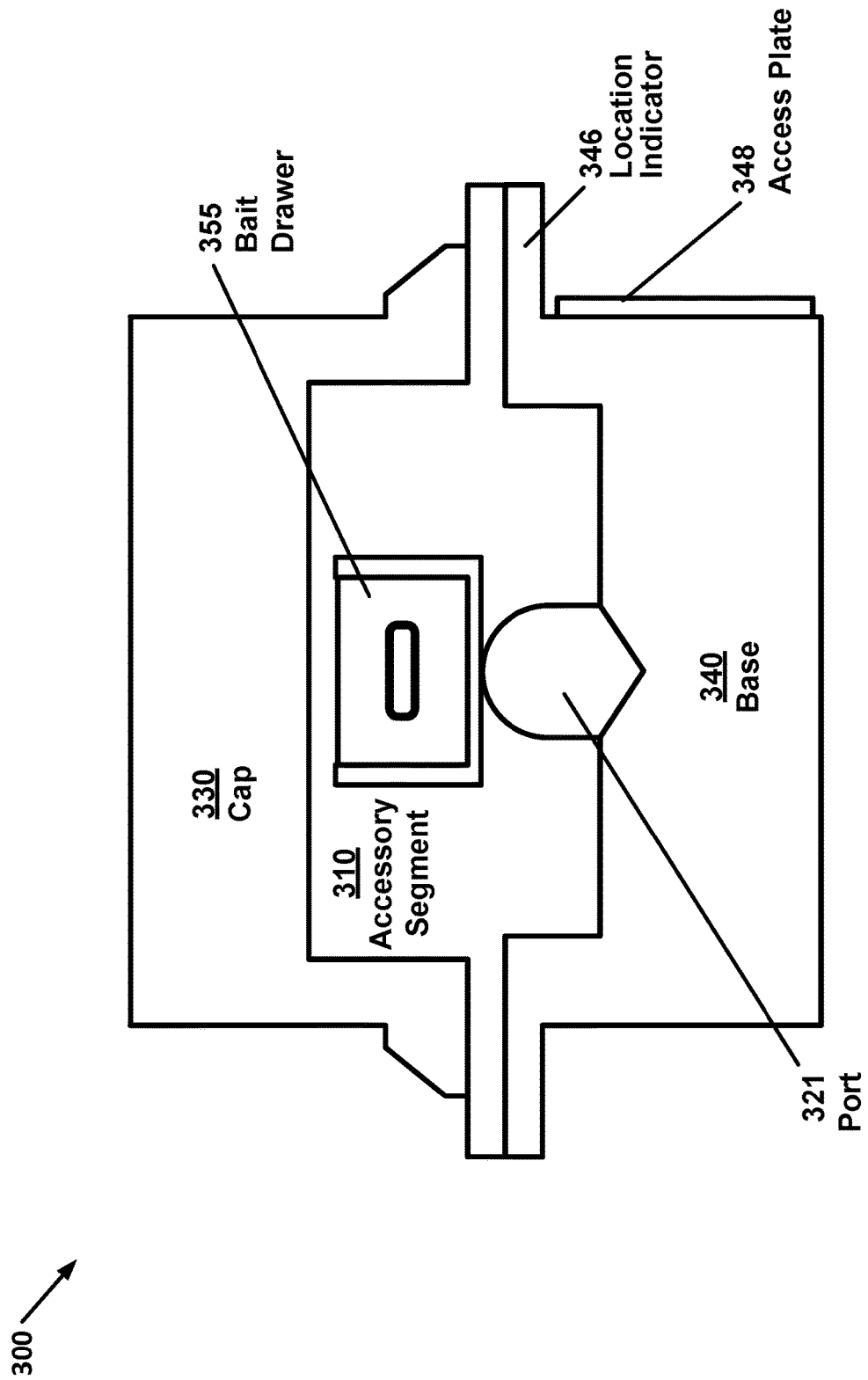
FIG. 3 is a front view of an example animal monitoring station as per an aspect of an embodiment of the present disclosure.

FIG. 3 is a front view of an example animal monitoring station as per an aspect of an embodiment of the present disclosure. The housing 300 may comprise a base segment (e.g. 340), an accessory segment (e.g. 310), and/or a cap (e.g. 330). According to an example embodiment, a removable bait drawer (e.g. 355) may provide access to a bait receptacle (not shown). An access plate (e.g. 348) may provide access to internal chamber(s) of the housing 300. Plate indicator(s) (e.g. 346) may be employed to set the housing in a desired location, such as for example, near the ground so that port(s) (e.g. 321) are near the ground level.

Figure 4:
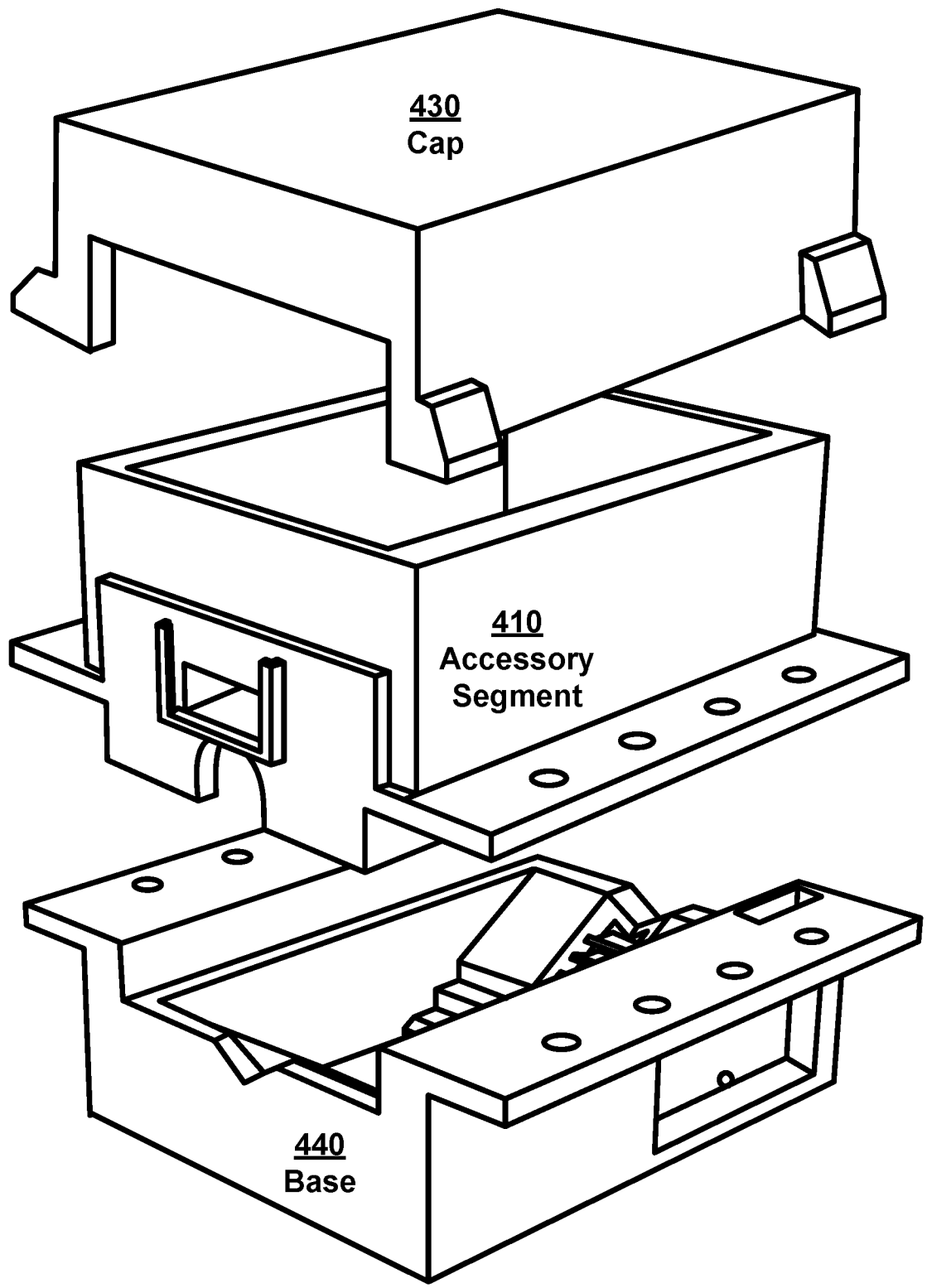
FIG. 4 is an exploded view of example housing parts of an animal monitoring station as per an aspect of an embodiment of the present disclosure.

FIG. 4 is an exploded view of example housing parts of an animal monitoring station as per an aspect of an embodiment of the present disclosure. An embodiment of an animal monitoring station may comprise a base segment (e.g. 440), an accessory segment (e.g. 410) and a cap (e.g. 430). Embodiments of each of these elements are discussed further in this disclosure, both individually and combined.

Figure 5:
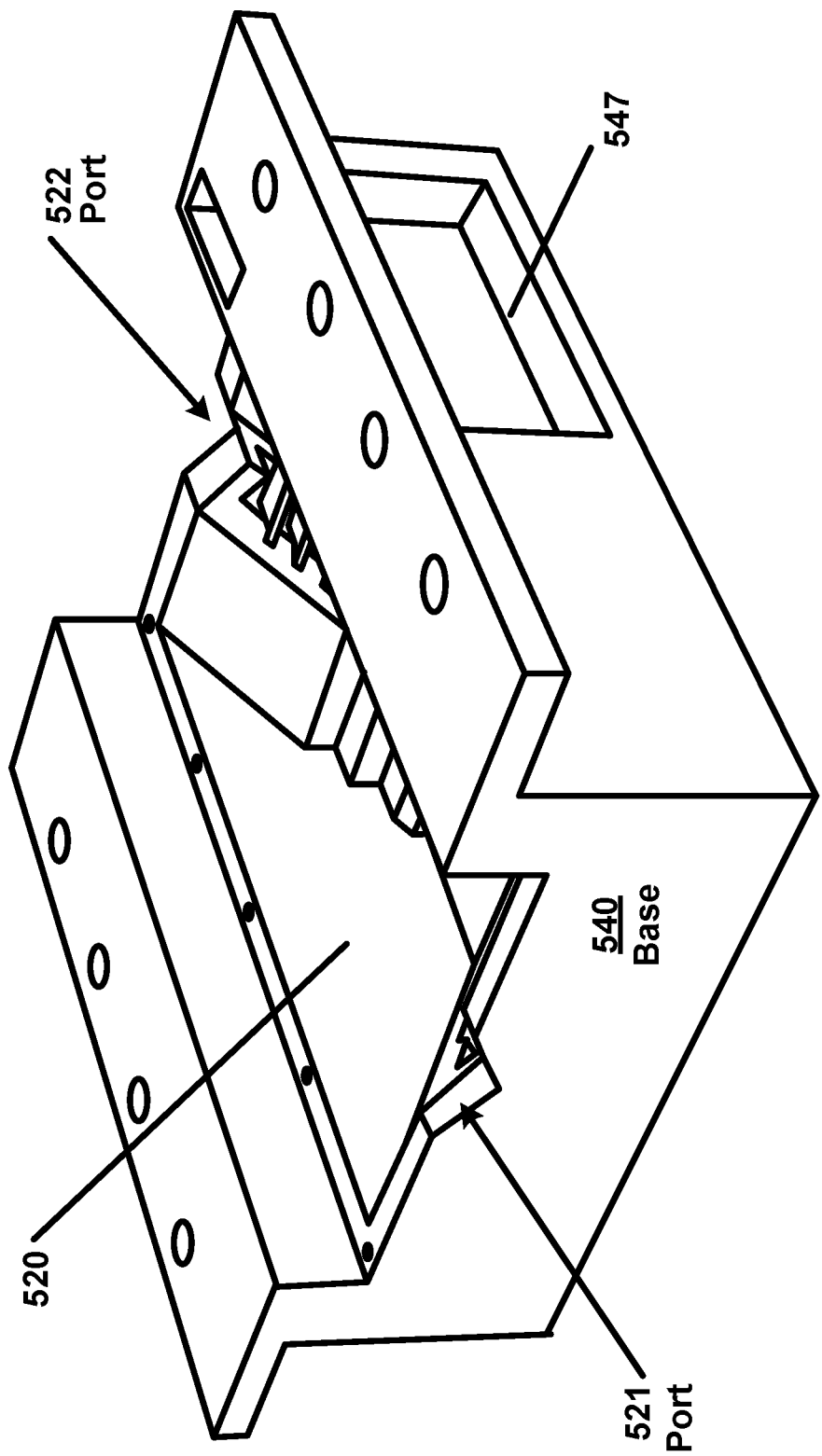
FIG. 5 is an illustration of an example base segment of an animal monitoring station as per an aspect of an embodiment of the present disclosure.

FIG. 5 is an internal view of an example housing base segment (e.g. 540) of an animal monitoring station as per an aspect of an embodiment of the present disclosure. The lower base segment (e.g. 540) may comprise an observation chamber (e.g. 520) comprising scale and camera system(s). In this example embodiment, an observation chamber access pathway (e.g. 547) may be recessed in a side portion of the base segment (e.g. 540) to provide access to parts of the observation chamber (e.g. 520). The observation chamber access pathway (e.g. 547) may be configured as a sub-chamber to contain electronics, such as, for example, an Open Scale Board. Two ports (e.g. 521 and/or 522), fore and aft, may act passively as both an entrance and an exit for visitors to the station.

Figure 6:
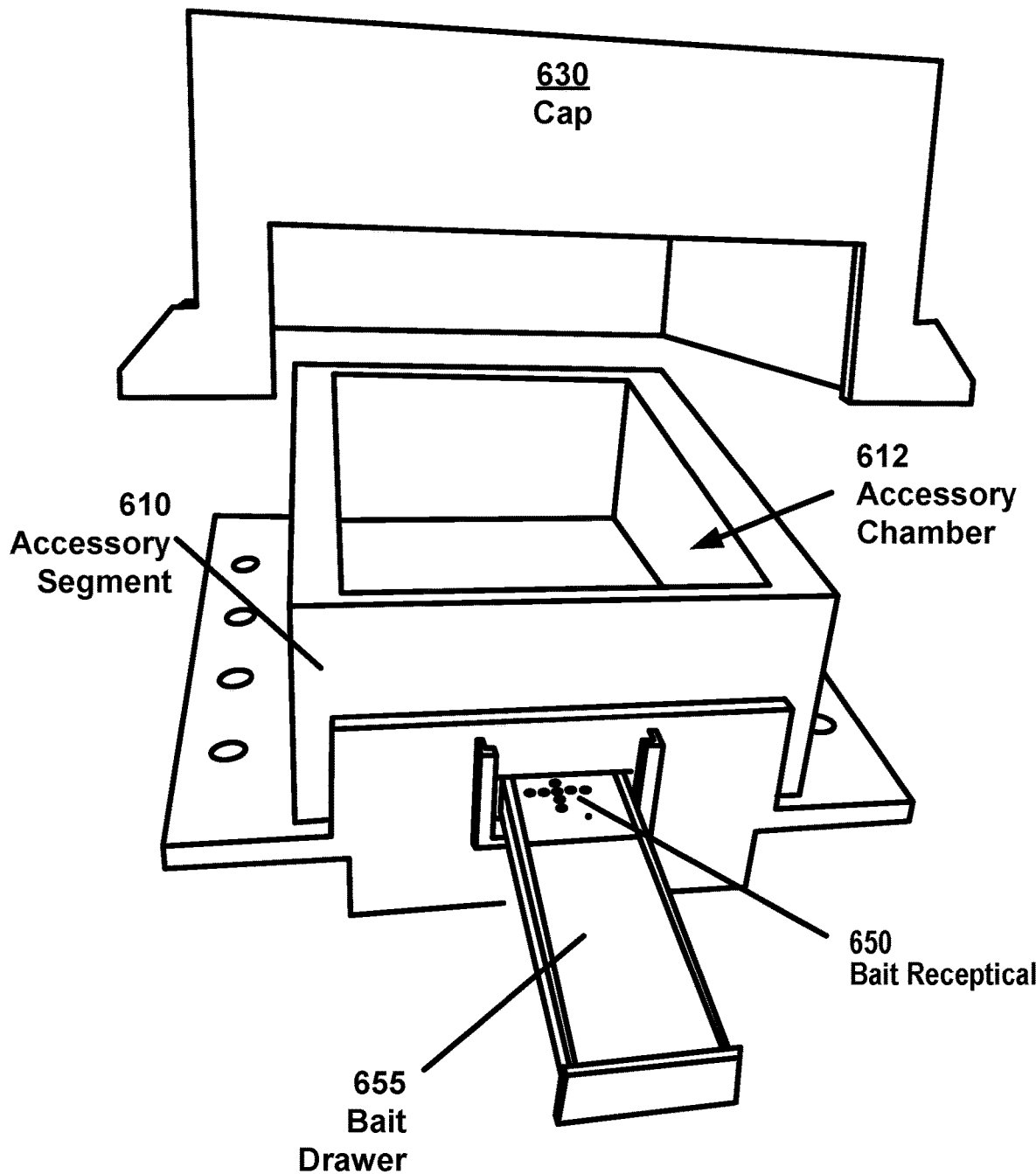
FIG. 6 is a view of an example accessory segment and cap of an animal monitoring station as per an aspect of an embodiment of the present disclosure.

FIG. 6 is a view of an example accessory segment (e.g. 610) and cap (e.g. 630) of an animal monitoring station as per an aspect of an embodiment of the present disclosure. The accessory segment (e.g. 610) may comprise an access to a bait receptacle (e.g. 650). In this example, access to the bait receptacle (e.g. 650) may be via a bait drawer (e.g. 655). It is anticipated that alternative bait receptacles and access will be employed in various alternative embodiments. When fitted together, the accessory segment (e.g. 610) and cap (e.g. 630) may form an accessory chamber (e.g. 612). The accessory chamber (e.g. 612) may comprise an area configured to house electrical components.

Figure 7:
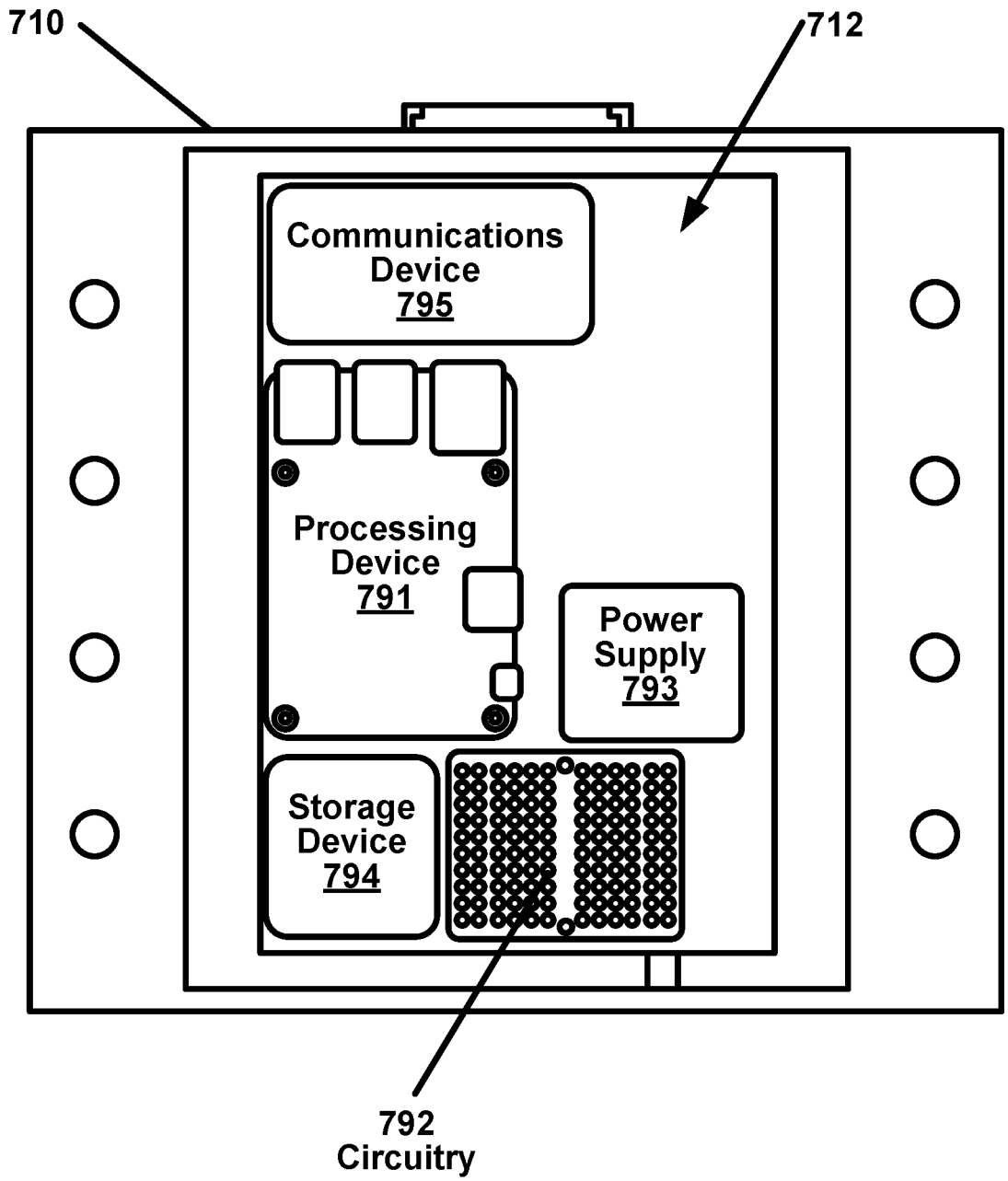
FIG. 7 is an internal view of an example accessory chamber of an animal monitoring station as per an aspect of an embodiment of the present disclosure.

FIG. 7 is an internal view of an example accessory segment (e.g. 710) of an animal monitoring station as per an aspect of an embodiment of the present disclosure. The accessory segment (e.g. 710) may comprise an accessory chamber (e.g. 712). The accessory chamber (e.g. 712) may comprise an area configured to house electrical components.

This example illustrates the accessory chamber (e.g. 712) housing example electrical components such as: a processing device (e.g. 791), a storage device (e.g. 794), signal processing circuitry (e.g. 792), a power supply (e.g. 793), and a communications device (e.g. 795). These are only examples of electrical components that be housed in accessory chamber (e.g. 712). It is anticipated that other combinations of devices, more or less may be housed in accessory chamber (e.g. 712).

These electronic components are shown merely as examples. One skilled in the art will recognize that other electronic components may be employed within the scope of the disclosure. Processor (e.g. 791) may comprise, for example, a Raspberry Pi 3 Microcomputer and/or the like. Circuitry (e.g. 792) may comprise, for example, a signal processing board such as an Open Scale Board. An example Open Scale Board may be obtained from SparkFun Electronics of Niwot, Colo. The SparkFun OpenScale board may comprise: an ATmega328P microcontroller for addressing communications and transferring data to a serial terminal or to an external data logger, an FT231 with mini USB for USB to serial connection, a HX711 24-bit ADC designed for weigh scales and industrial control applications to interface directly with a bridge sensor weigh scales, a TMP102 temperature sensor for recording the ambient temperature of the system. The OpenScale may communicate at a TTL level of 9,600 bps 8-N-1 by default and possesses a baud rate configurable from 1,200 bps to 1,000,000 bps analog-to-digital converter. A power supply (e.g. 793) may comprise a battery. The battery may comprise a USB 10000 mAh Battery. Alternative batteries may comprise a lithium coin cell battery. The Power supply (e.g. 793) may comprise a solar panel and/or solar panel processing circuitry. The power supply (e.g. 793) may comprise an AC to DC converter. The power supply (e.g. 793) may comprise a thermoelectric generating circuit. A communications device (e.g. 795) may comprise a radio, a cellular communications device, combinations thereof, and/or the like. A storage device (e.g. 794) may be configured to store sensor data. Storage device (e.g. 794) may comprise a disc drive, a flash drive, a solid state drive, combinations thereof, and/or the like.

Figure 8:
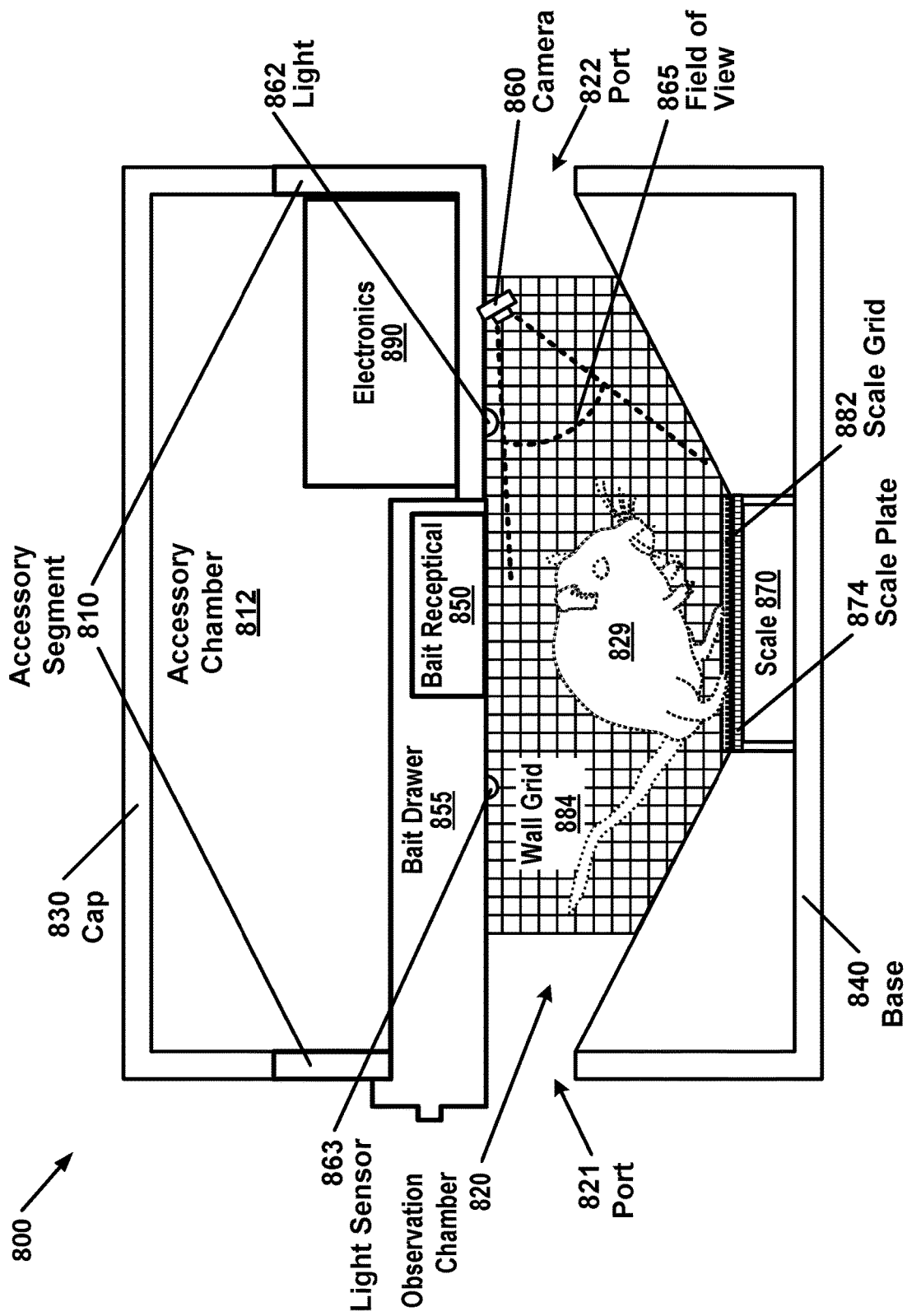
FIG. 8 is a cross-sectional view of an example animal monitoring station as per an aspect of an embodiment of the present disclosure.
Figure 9:
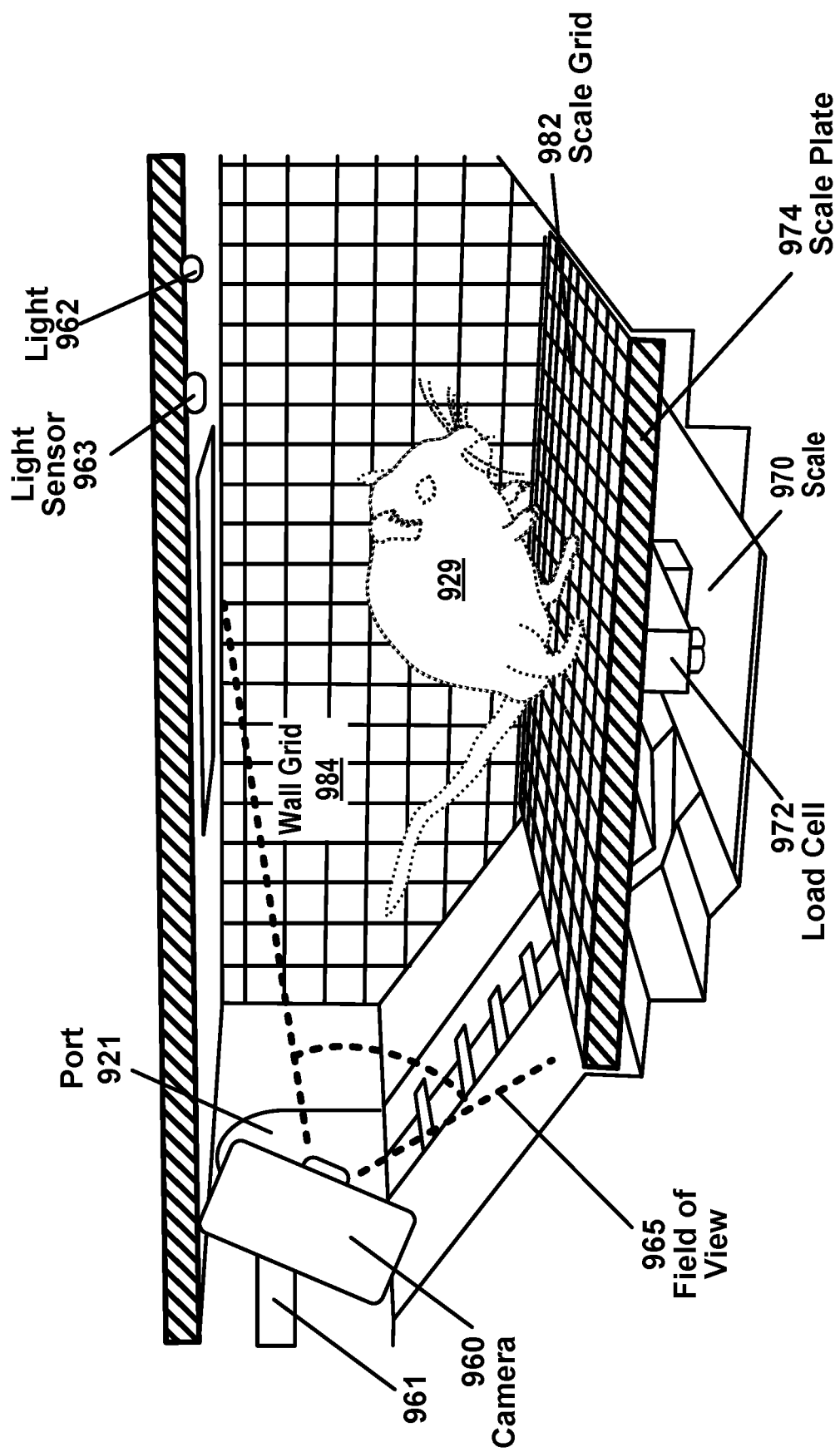
FIG. 9 is a cross-sectional view of an example observation chamber of an animal monitoring station as per an aspect of an embodiment of the present disclosure.

FIG. 8 is an internal view of an example animal monitoring station as per an aspect of an embodiment of the present disclosure. FIG. 9 is a cross-sectional view of an example observation chamber of an animal monitoring station as per an aspect of an embodiment of the present disclosure. These example embodiments will be discussed together with respect to similar elements. These examples animal monitoring stations may comprise a housing (e.g. 800), camera(s) (e.g. 860 and/or 960), scale(s) (e.g. 870 and/or 970), and/or sizing grid(s) (e.g. 882, 982, 883 and/or 983). The housing (e.g. 800) may comprise, for example, a base segment (e.g. 840), an accessory segment (e.g. 810), and/or a cap (e.g. 830). The housing (e.g. 800), when assembled, may form one or more chambers such as, for example, observation chamber (e.g. 820 and/or 920) and/or accessory chamber (e.g. 812). The housing (e.g. 800), when assembled, may comprise at least one port (e.g. 821, 921, and/or 422) The port(s) (e.g. 821, 921, and/or 822) may be mechanically configured to allow an animal (e.g. 829 and/or 929) ingress and egress access to the observation chamber (e.g. 820 and/or 920). The housing (e.g. 800), when assembled, may comprise a bait receptacle (e.g. 850) configured to lure the animal of interest (e.g. 829 and/or 924) into the observation chamber (e.g. 820 and/or 920). Various sensors and/or actuators may be disposed to observe the animal (e.g. 829 and/or 924). For example, camera(s) (e.g. 860 and/or 960) may be disposed in the observation chamber (e.g. 820 and/or 920). The scale(s) (e.g. 870 and/or 970) may be disposed in a field of view (e.g. 865 and/or 965) of the camera(s) (e.g. 860 and/or 960). Sizing grid(s) (e.g. 884, 984, 870, and/or 970) may be also be disposed in the field of view (e.g. 865 and/or 965).

Port(s) (e.g. 821, 822, and/or 921) may be mechanically configured to allow an animal (e.g. 829 and/or 929) ingress and egress access to the observation chamber (e.g. 820 and/or 920). The size of the port(s) (e.g. 821, 822, and/or 921) may be based on the size of an animal (e.g. 829 and/or 929) which the animal monitoring station is configured to attract. For example, the size of the port(s) (e.g. 821, 822, and/or 921) may be larger than the size of the animal (e.g. 829 and/or 929) to let the animal (e.g. 829 and/or 929) freely enter and exit the observation chamber (e.g. 820 and/or 920). The size of the port(s) (e.g. 821, 822, and/or 921) may be smaller than the size of a second animal, which the port does not wish to enter and exit the observation chamber (e.g. 820 and/or 920). For example, if the observation chamber (e.g. 820 and/or 920) is being setup to attract a mouse, the port(s) (e.g. 821, 822, and/or 921) may be sized to allow the mouse easy access to the observation chamber (e.g. 820 and/or 920), but the port(s) (e.g. 821, 822, and/or 921) may also be sized to prevent access of another type of animal such as a raccoon.

The animal monitoring station may be configured to attract particular type(s) of animals (an animal of interest (e.g. 829 and/or 929)). The animal (e.g. 829 and/or 929) may be at least one of the following: a mamma; an amphibian; a reptile; an avian; an aquatic animal, and/or the like. For example, the animal may be at least one of the following: a mouse; a shrew; a bat; a bird; a turtle; a cat, and/or the like.

A bait receptacle 850 may be disposed to provide access to bait inside the observation chamber (e.g. 820 and/or 920). As illustrated, the bait receptacle (e.g. 850) may be disposed in a bait drawer 855 for easy removal and refilling. However, other types of bait receptacles may be employed. For example, a stationary bait receptacle may be employed. The bait receptacle may comprise a drawer 855. The bait receptacle (e.g. 850) may be removable. The bait receptacle (e.g. 850) may be disposed in proximity to and/or above a scale (e.g. 870 and/or 970). By positioning the bait receptacle (e.g. 850) in proximity to a scale (e.g. 870 and/or 970), the bait receptacle (e.g. 850) may lure the animal (e.g. 829 and/or 929) onto the scale (e.g. 870 and/or 970) where it may be weighed. According to an embodiment, the bait receptacle (e.g. 850) may be configured to hold liquid bait, solid bait, a combination thereof, and/or the like. The bait receptacle (e.g. 850) may be configured to reload the bait as the bait is consumed, becomes old, and/or the like. Some embodiments may employ alternative bait other than food, such as a scent emitter, a sound emitter, combinations thereof, and/or the like.

The scale (e.g. 870 and/or 970) may comprise a weight sensor. The weight sensor may comprise, for example, a load cell. The load cell may be mounted between a base segment (e.g. 840) of the housing (e.g. 800) and a scale plate (e.g. 874). An example load cell may comprise four strain gauges in a Wheatstone bridge configuration. Load cells of one strain gauge (quarter-bridge) or two strain gauges (half bridge) may also be available. The electrical signal output is typically in the order of a few millivolts and may require amplification by an instrumentation amplifier. The output of the transducer may be scaled to calculate the force applied to the transducer. Example types of the various load cells include hydraulic load cells, pneumatic load cells and strain gauge load cells, and/or the like. Scale 470 may comprise other types of weight sensor(s), such as for example, piezo-electric load cells, vibrating wire load cells, and capacitive load cells where the capacitance of a capacitor changes as the load presses the two plates of a capacitor closer together, pressure sensors, scale sensors, spring sensors, and/or the like. Example pressure sensors include: the FS-2513P Piezo film based sensor from Prowave Electric Corp. of Taiwan, the FSS 1500NSB sensor from Honeywell International Inc. of Moorestown, N.J., the FS20 from Measurement Specialist of Hampton, Va., the S215 from Strain Measurement Devices of Wallingford, Conn., and/or the like. The scale may generate a voltage that may be translated to a weight.

The weight sensor(s) (e.g. 870 and/or 970) may be disposed inside observation chamber (e.g. 820 and/or 920). In these embodiments, the weight sensor(s) (e.g. 870) may be electrically connected to the components in the housing. According to some embodiments, the weight sensor(s) (e.g. 870) may employ discrete attachment mechanism(s) to the housing (e.g. 800). The load cell may be configured for measuring very small or very large masses. Load cell(s) and/or other measurement sensors may be powered by separate power source(s) (i.e. separate battery). Output signal(s) from sensors (such as a load cell), may be amplified to be compatible with the input conversion capability of the processing module. For example, the sensor output may be an analog signal that is converted into a digital value using an analog-to-digital converter. In the case that the resolution of the analog-to-digital converter is too low, an amplifier may be employed to increase the resolution of the signal. Alternatively, if the analog output is too large, an attenuation circuit may be employed to reduce the signal size. Some embodiments may employ automatic gain amplifier circuits.

The camera(s) (e.g. 860) may comprise a still camera, a video camera, a combination thereof, and/or the like. The camera(s) (e.g. 860 and/or 960) may comprise a depth sensing camera, a 3D camera, or other device configured to take spatial measurements of the animal (e.g. 829 and/or 929). The animal monitoring station may comprise more than one camera (e.g. 860 and/or 960). The additional camera(s) may be mounted inside the observation chamber (e.g. 820 and/or 920) and/or outside the observation chamber (e.g. 820 and/or 920).

The animal monitoring station may employ a grid (e.g. wall grid 884 and/984; and/or scale grid 882 and/or 982). Grid(s) (e.g. wall grid 884 and/984; and/or scale grid 882 and/or 982) may comprise measurement grid(s). Grid(s) (e.g. wall grid 884 and/984; and/or scale grid 882 and/or 982) may be a visual sizing grid. Grid(s) (e.g. wall grid 884 and/984; and/or scale grid 882 and/or 982) may comprise a pattern configured to assist in determining measurements of an animal (e.g. 829 and/or 929) in front of, or otherwise near the grid (e.g. wall grid 884 and/984; and/or scale grid 882 and/or 982). Grid(s) (e.g. wall grid 884 and/984; and/or scale grid 882 and/or 982) may be disposed on one or more locations such as, for example, on scale(s) (e.g. 870 and/or 970), on floor(s) of the observation chamber (e.g. 820 and/or 920), on wall(s) of the observation chamber (e.g. 820 and/or 920), combinations thereof, and/or the like. The animal monitoring station may comprise at least one additional grid. A scale grid (e.g. 882 and/or 982) may be applied to scale plate (e.g. 874, and/or 984). A scale grid (e.g. 882 and/or 982) may be integrated with a scale plate (e.g. 874, and/or 984).

The animal monitoring station may comprise: one or more processors; and memory storing instructions that, when executed by the one or more processors, cause the animal monitoring station to take certain actions. For example, the instructions may cause the animal monitoring station, in response to a trigger indicating the presence of the animal (e.g. 829 and/or 929): to measure, by the scale (e.g. 870 and/or 970), a weight; and to capture, by the camera (e.g. 860 and/or 960), an image. The instructions may cause the animal monitoring station to stream data, to store data in a data storage data device, combinations thereof, and/or the like. The instructions may cause the animal monitoring station to associate a timestamp to data. The instructions may further cause the animal monitoring station to determine at least one body measurement of the animal (e.g. 829 and/or 929) employing an image of the animal (e.g. 829 and/or 929) and the grid (e.g. wall grid 884 and/984; and/or scale grid 882 and/or 982).

The image may be a still image, and/or a moving image. The image may comprise data associated with the image, such as, for example, time data, temperature data, depth data, combinations thereof, and/or the like.

A trigger indicating the presence of the animal (e.g. 829 and/or 929) may be based on a weight measurement threshold. The trigger may be based on a detected motion. Motion may be detected via a motion sensor, via a camera (e.g. 860 and/or 960), via at least one of an electromagnetic radiation emitter and an electromagnetic radiation detector, combinations thereof, and/or the like. The trigger may be based on a detected sound, a detected vibration, combinations thereof, and/or the like.

The animal monitoring station may further comprise a light (e.g. 862 and/or 962) disposed inside the observation chamber (e.g. 820 and/or 920). The light (e.g. 862 and/or 962) may comprise a light emitting diode (LED). The light (e.g. 862 and/or 962) may emit infrared radiation. The light (e.g. 862 and/or 962) may emit radiation configured to not disturb the animal (e.g. 829 and/or 929). The animal monitoring station may further comprise a light sensor (e.g. 863 and/or 963). The animal monitoring station may further comprise a circuit configured to activate a light (e.g. 862 and/or 962) disposed in the observation chamber (e.g. 820 and/or 920) in response to a light measurement (e.g. via light sensor 863 and/or 963) being less than a threshold. The animal monitoring station may comprise a daylight sensor employed to determine when to activate the light (e.g. 862 and/or 962). The LED lighting system may be coupled with an analog-to-digital photoresistor for monitoring the ambient lighting within the observation chamber (e.g. 820 and/or 920) such that the monitoring system may trigger infrared lighting to compensate for proper exposure during periods of inefficient light levels.

The housing 800 may further comprise an additional accessory chamber 812. The accessory chamber 812 may be configured to house electronics 890. The electronics 890 may comprise a wireless transmitter and/or receiver. The electronics 890 may comprise a data storage device. The additional chamber may house a power supply. The power supply may comprise a battery, a power conversion circuit, a power filter, and/or the like. The animal monitoring station may employ solar cell(s) as a source of power. The solar cell(s) may be mounted outside of the housing 890.

The animal monitoring station may comprise additional sensors. Examples of additional sensors include, but are not limited to: microphone(s), vibration sensor(s), motion sensor(s), chemical analysis sensors (e.g. spectrometer), a temperature sensor, a breathing sensor, etc. The animal monitoring station may comprise biological material collectors such as, but not limited to a venom collector, and/or a urine collector. A urine collector may employ absorbent pads. Urine may be used to determine information about visiting animals such as, whether they are male or female, whether they are pregnant and/or lactating, and hormone levels. A breathing detector may comprise a 3D, a laser focused on an animal's chest, a sound sensor, a pressure sensor, and/or the like. Detected breathing rates may provide an indirect measure of an animal's metabolism.

Embodiments may be configured to collect weights, measurements, and photographs of animal visitors (e.g. 829 and/or 929) while allowing the animal visitors (e.g. 829 and/or 929) to enter and exit at will. The animal monitoring station may obviate the need for frequent trap checking or handling of small, often fragile mammals. Data may be collected using a combination of camera(s) (e.g. 460 and/or 960), scale(s) (e.g. 870 and/or 970), and processing devices. Photographs and video may be taken as a scale plate (e.g. 874 and/or 974) of the scale (e.g. 870 and/or 970) is touched, while the scale (e.g. 870 and/or 970) records a voltage that may be translated to a mass (or weight). The translated mass may be in, for example, a standard international (SI) unit (e.g. grams and/or Newtons). The translated mass may be in, for example, a non-SI unit (e.g. pound, slug, and/or dyne). Embodiments may employ wireless devices (for example, the BCM43438 WIFI chip and Bluetooth Low Energy capabilities built-in to the Raspberry Pi 3 microcomputer), to transmit data directly to a server, a laptop, or phone for efficient field-monitoring. Bluetooth Low Energy (BLE) wireless communications may be employed to communicate and/or display data to local or nearby computers and other devices. Other wireless devices comprise cellular wireless devices, 5G wireless devices, short wave radios, satellite wireless devices, combinations thereof, and/or the like.

A scale (e.g. 870 and/or 970) may comprise multiple sub components. A scale plate (e.g. 874 and/or 974) may form a false bottom of the observation chamber (e.g. 820 and/or 920). The scale plate (e.g. 874 and/or 974) may sit atop a load cell (e.g. 972). The load cell (e.g. 972) may comprise a micro load cell. The load cell (e.g. 972) may be selected and/or configured based on a predicted weight of visitor animals (e.g. 829 and/or 929). For example, with small mammals, the load cell (e.g. 972) may be selected and/or configured to weigh animals up to 780 grams. The load cell (e.g. 972) may be wired to electronics (e.g. an Open Scale Board) through a small passage between the observation chamber (e.g. 820 and/or 920) and a compartment housing the Open scale board.

A stem mount (e.g. 961) may mount a camera (e.g. 860 and/or 960) to a surface of the observation chamber (e.g. 820 and/or 920). For example, the stem mount (e.g. 961) may be disposed on a wall of the observation chamber (e.g. 820 and/or 920). The camera (e.g. 860 and/or 960) may be encased in an enclosure. The enclosure may be configured to protect the camera from damage from environmental factors and/or the animal (829 and/or 929). The enclosure may comprise multiple parts. The multiple marts may comprise a back half and a front half. The stem mount (e.g. 961 may mount the back half of the enclosure to a surface of the observation chamber (e.g. 820 and/or 920). An example camera (e.g. 860 and/or 960) is a Raspberry Pi NOIR v2 camera. Other camera(s) may be employed. A cable may connect the camera (e.g. 860 and/or 960) to electronics (e.g. 890). The electronics (e.g. 890) may comprise a port (e.g. a CSI camera port) on a processor (e.g. 891). The cable may be routed via a pass-through of the base (e.g. 840). The pass-through may comprise a slit, a hole, and/or the like.

Visitors (e.g. 829 and/or 929) may passively enter an animal monitoring station. While in the animal monitoring station, the visitor (e.g. 829 and/or 929) may be recorded via video footage and/or still photography. Application of weight to a scale plate (e.g. 874 and/or 924) that is above a configured threshold may trigger camera(s) (e.g. 860 and/or 960) to begin image capturing. The number of images and/or length of video captured may be configurable and adjusted. Images and/or video files may be saved to local storage and/or the recorded data of visitors (e.g. 829 and/or 929) may be saved for communication to remote device. For example, video may be saved to a JavaScript Object Notation (.JSON) file format and uploaded to the MMDS cloud server. Records may include length (mm), weight (g), imagery (.mp4/.jpg), and a current timestamp. Data files may be transferred to a central server via, for example, a BCM43438 WIFI chip built-in to the Raspberry Pi 3 microcomputer. Data may be uploaded and/or accessed from a server. An example server of interest to animal researches may be available through the Animal monitoring station Research Community. Members may access, share, or restrict distribution of their data collected by their registered device/s.

Embodiments may: reduce the probability of death of small animals with high metabolic rates that traditionally are killed or severally injured when subjected to small confined spaces for extended periods of confinement, capture behavioral data during video capture that traditional methods are incapable of recording, capture video and still photography of one or more individuals simultaneously, provide continued 24-hour operation unlike traditional traps/methods, and/or capture records on individuals that weight too little to be captured with traditional traps/methods.

Figure 10:
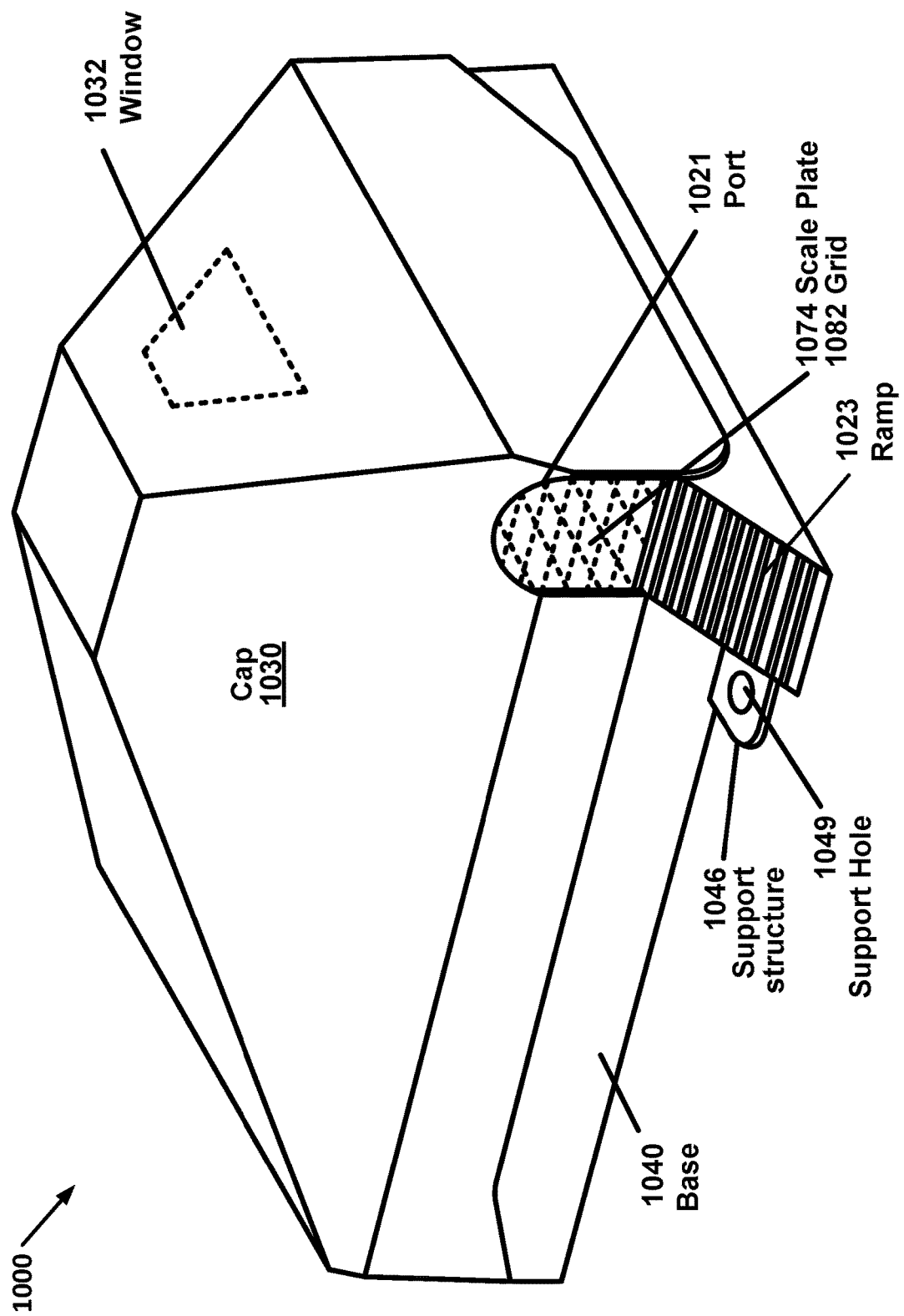
FIG. 10 is a perspective view of an example of an animal monitoring station as per an aspect of an embodiment of the present disclosure.

FIG. 10 is a diagram of an example animal monitoring station as per an aspect of an embodiment of the present disclosure. As shown in this example illustration, the animal monitoring station may comprise a housing 1000 formed by the combination of a base 1040 and a cap 1030. It is anticipated that some alternative embodiments may combine the base 1040 and cap 1030. The base 1040 may comprise a ramp (e.g. 1023). As illustrated, the ramp (e.g. 1023) may be an ascending ramp configured to allow a visitor access to an internal observation chamber via port (e.g. 1021). According to various embodiments, ramps (e.g. 1023) may be configured inside and/or outside the housing 1000. According to various embodiments, ramps (e.g. 1023) may be configured to ascend and/or descend. Also visible in this example illustration, via port (e.g. 1021), is a scale plate (e.g. 1074) with a grid (e.g. 1083) located in the observation chamber.

According to an embodiment, the housing 1000 may further comprise a support structure(s) (e.g. 1046). The support structure(s) (e.g. 1046) may comprise a staking support, a leg support, a combination thereof, and/or the like. The support structure(s) (e.g. 1046) may comprise a connecting structure (e.g. support hole 1049) to facilitate mounting of the base (e.g. 1040) to a desired location. The housing 1000 may further comprises a position indicator. The position indicator may be combined with the support structure(s) (e.g. 1046).

The position indicator may be configured as a ground alignment indicator. The ground alignment indicator may provide a mechanism to allow easy placement of the housing so that the port is at a desired level and/or orientation, such as, for example, at ground level, and/or oriented horizontal.

According to an embodiment, the cap (e.g. 1030) may be insulated. Insulation may help maintain a temperature suitable for animal visitors of the monitoring station. The housing 1000 may further comprise a shape mechanically configured to shed falling precipitation. For example, the cap (e.g. 1030) may have a slanted shape angled to deflect falling water away from the port(s) (e.g. 1021) of the housing 1000.

The housing 1000 may further comprise an optional light passing structure (e.g. 1032) to let light into a chamber. The light passing structure (e.g. 1032) may comprise, for example, an opening, a translucent window, a transparent window, combinations thereof, and/or the like. The light passing structure (e.g. 1032) may be disposed on various surfaces of the housing 1000 including various portions of the cap (e.g. 1030), the whole cap (e.g. 1030), a portion of base (e.g. 1040) (e.g., and/or the like.

Figure 11:
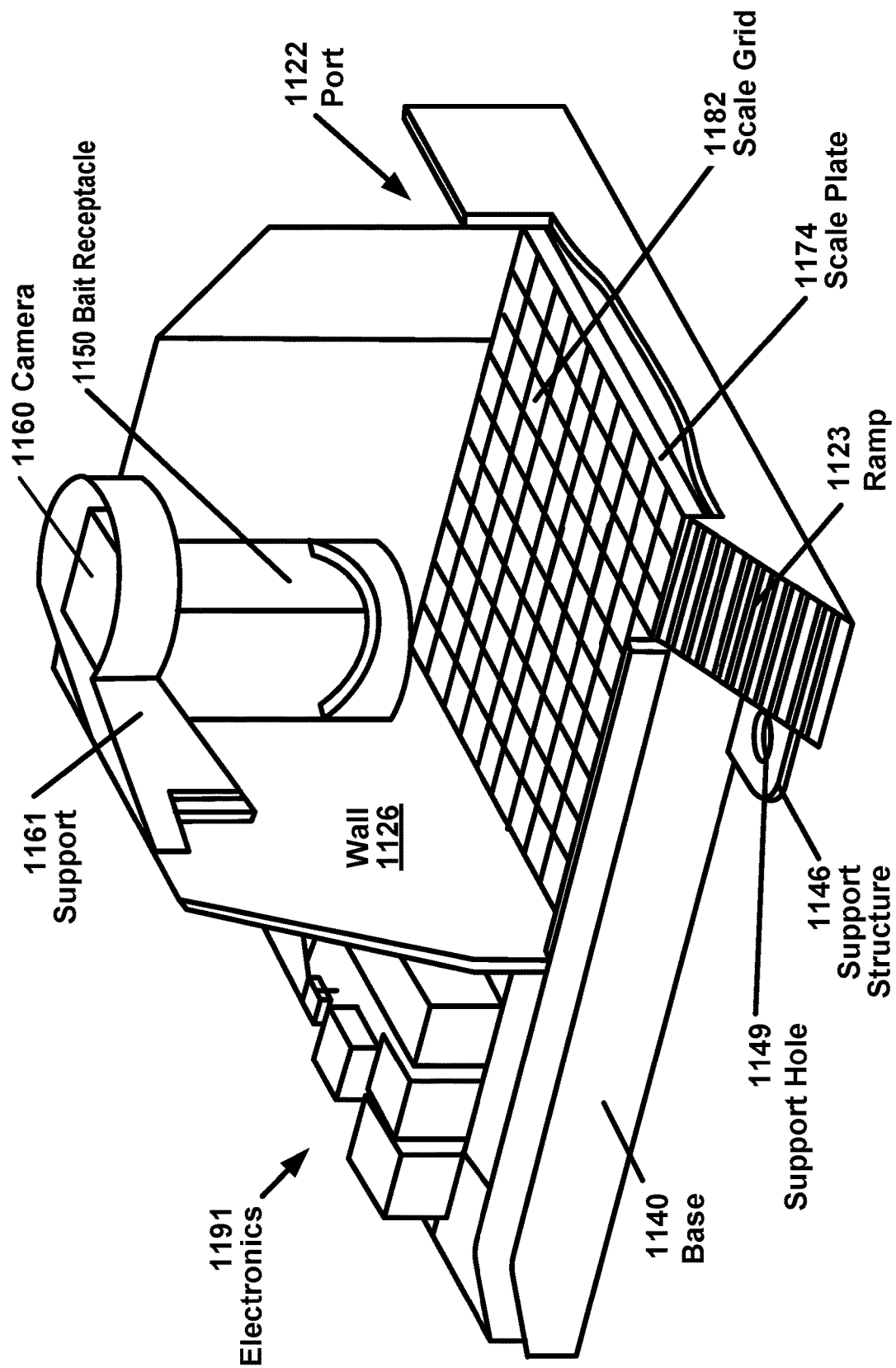
FIG. 11 is a perspective view of an example of an animal monitoring station without a cap as per an aspect of an embodiment of the present disclosure.

FIG. 11 is a perspective view of an example of an animal monitoring station without a cap (e.g. 1030) as per an aspect of an embodiment of the present disclosure. As shown in this example illustration, the animal monitoring station may comprise a base (e.g. 1140) and/or internal wall(s) (e.g. 1126) configured to separate an observation chamber from an accessory chamber. These chambers may be formed when a cap (e.g. 1030) is mounted over the illustrated structure. The base (e.g. 1140) may comprise a ramp (e.g. 1123). As illustrated, the ramp (e.g. 1123) may be an ascending ramp configured to allow a visitor access to an internal observation chamber via port(s) (e.g. 1021). According to various embodiments, ramps (e.g. 1123) may be configured inside and/or outside the base (e.g. 1140) (e.g. According to various embodiments, ramps (e.g. 1123) may be configured to ascend and/or descend.

A scale plate (e.g. 1174) may be located in the observation chamber as at least part of a floor of the observation chamber. A grid (e.g. 1182) may be disposed on the scale plate (e.g. 1174). The grid (e.g. 1182) may be integral to the scale plate (e.g. 1174). Additional grids may be disposed on other surfaces of the observation chamber. For example, a grid may be disposed on an internal wall (e.g. 1126). A grid (e.g. 1182) may comprise a series of lines to support determining a measurement of an animal when imaged in front of the grid (e.g. 1182). A grid (e.g. 1182) may comprise alternative patterns, such as for example a series of dots, a series numbers, a cross-hatches, curves, combinations thereof, and/or the like.

The base (e.g. 1140) may comprise a support structure(s) (e.g. 1146). The support structure(s) (e.g. 1146) may comprise a staking support, a leg support, a combination thereof, and/or the like. The support structure(s) (e.g. 1146) may comprise a connecting structure (e.g. support hole 1149) to facilitate mounting of the base (e.g. 1140) to a desired location. The base (e.g. 1140) may comprise a position indicator. The position indicator may be combined with the support structure(s) (e.g. 1146). The position indicator may be configured as a ground alignment indicator. The ground alignment indicator may provide a mechanism to allow placement of the housing so that the port is at a desired level and/or orientation, such as, for example, at ground level, and/or oriented horizontal.

A wall (e.g. 1126) may separate an observation chamber from an accessory chamber. The accessory chamber may comprise electronics and/or other support devices. Electronics (e.g. 1191) may comprise processors, communications devices, image processing devices, storage devices, power supplies, measurement circuitry, combinations thereof, and/or the like.

The observation chamber may comprise a bait receptacle (e.g. 1150). The bait receptacle (e.g. 1150) may be configured to lure an animal visitor to the observation chamber.

The bait receptacle (e.g. 1150) may be mounted to one or more walls (e.g. 1126) of the observation chamber. The bait receptacle (e.g. 1150) may be removable. The bait receptacle (e.g. 1150) may be refillable. The bait receptacle (e.g. 1150) may be self-filling. The self-filling bait receptacle (e.g. 1150) may fill by, for example, gravity dropping bait into an open area of the bait receptacle (e.g. 1150) as the bait is removed from the open area of the bait receptacle (e.g. 1150).

The observation chamber may comprise a one or more cameras (e.g. 1160). The camera (e.g. 1160) may be configured and/or positioned to have a field of view of a visiting animal in front of one or more grids (e.g. 1182). The camera (e.g. 1160) may be mounted to a support (e.g. 1161). The support (e.g. 1161) may be mounted to one or more walls (e.g. 1126). The support (e.g. 1161) may be mounted to cap. The support (e.g. 1161) may be mounted to a floor of the observation chamber. The camera (e.g. 1160) may be configured to capture a still image of a visiting animal when triggered by an external sensor. The external sensor may comprise a scale. The external sensor may comprise a motion sensor. The external sensor may comprise a microphone. The external sensor may comprise a vibration sensor. The external sensor may comprise image recognition software operating on an image captured by one or more cameras (e.g. 1160).

Figure 12:
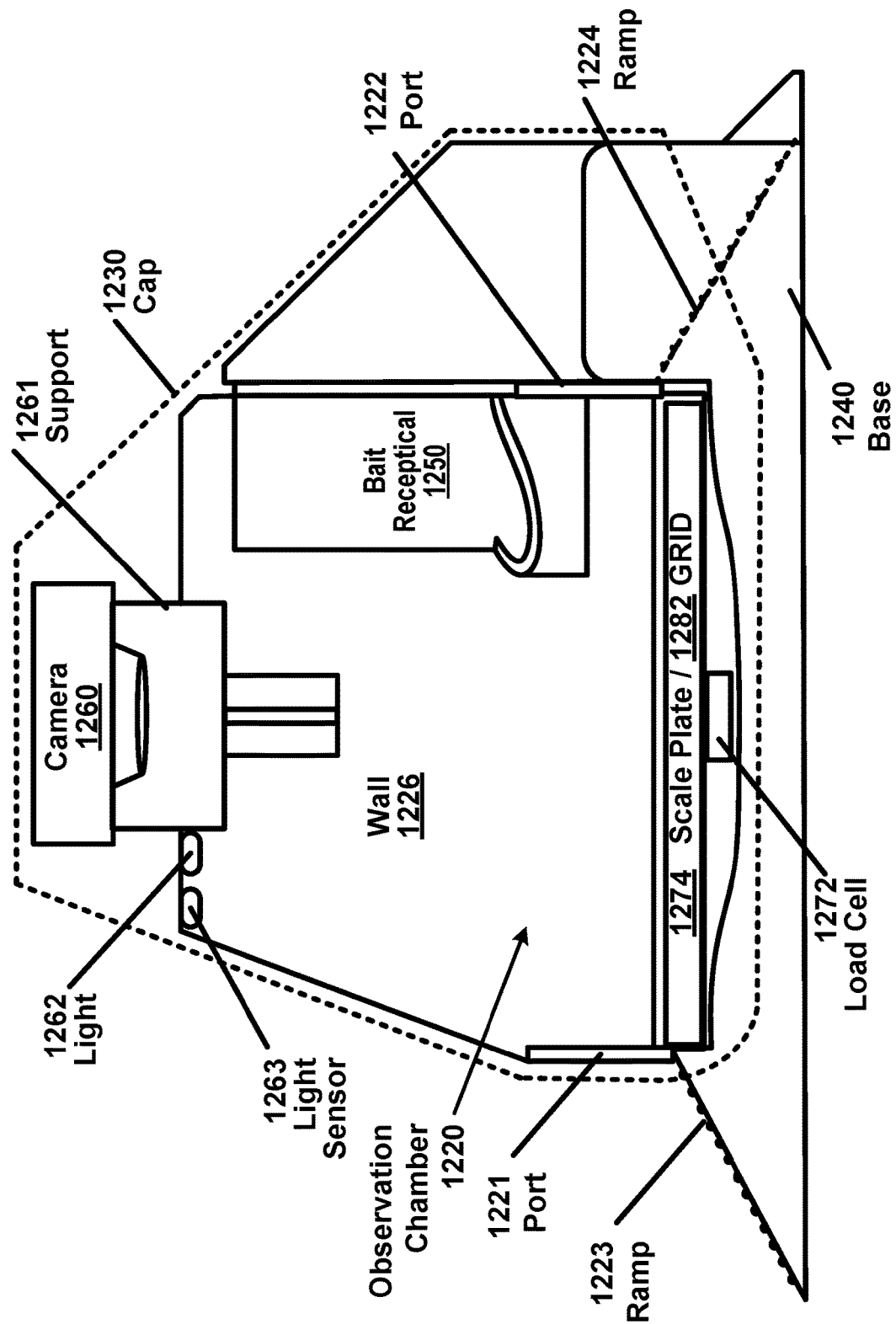
FIG. 12 is a cross-sectional view of an example observation chamber of an animal monitoring station as per an aspect of an embodiment of the present disclosure.

FIG. 12 is a cross-sectional view of an example observation chamber of an animal monitoring station as per an aspect of an embodiment of the present disclosure. As shown in this example illustration, the animal monitoring station may comprise a base (e.g. 1240), a cap (e.g. 1230), and internal wall(s) (e.g. 1226). The internal wall(s) (e.g. 1226) may be configured to separate an observation chamber (e.g. 1220) from an accessory chamber (not shown). These chambers may be formed when a cap (e.g. 1230) is mounted over the illustrated structure. The base (e.g. 1240) may comprise one or more ramps (e.g. 1223 and/or 1224). As illustrated, the one or more ramps (e.g. 1223 and/or 1224) may be configured to allow a visitor access to an internal observation chamber (e.g. 1220) via port(s) (e.g. 1221 and/or 1222). According to various embodiments, ramps (e.g. 1223 and/or 1224) may be configured inside and/or outside the base (e.g. 1240). According to various embodiments, ramps (e.g. 1223 and/or 1224) may be configured to ascend and/or descend.

A scale plate (e.g. 1274) may be located in the observation chamber (e.g. 1220) as at least part of a floor of the observation chamber (e.g. 1220). A grid (e.g. 1282) may be disposed on the scale plate (e.g. 1274). The grid (e.g. 1282) may be integral to the scale plate (e.g. 1274). Additional grids may be disposed on other surfaces of the observation chamber. For example, a grid may be disposed on an internal wall (e.g. 1226). A grid (e.g. 1282) may comprise a series of lines to support determining a measurement of an animal when imaged in front of the grid (e.g. 1282). A grid (e.g. 1282) may comprise alternative patterns, such as for example a series of dots, a series numbers, a cross-hatches, curves, combinations thereof, and/or the like. The scale plate may be mounted to a load cell (e.g. 1272) and/or other mass measurement device.

A wall (e.g. 1226) may separate an observation chamber (e.g. 1220) from an accessory chamber (not shown). The accessory chamber may comprise electronics and/or other support devices. Electronics may comprise processors, communications devices, image processing devices, storage devices, power supplies, measurement circuitry, combinations thereof, and/or the like.

The electronics may comprise a wireless device to communicate information between the animal monitoring station and a remote (to the animal monitoring station) location. The information may comprise data collected at the animal monitoring station. The information may comprise status data of the animal monitoring station. The information may comprise configuration data for the animal monitoring station. The wireless device may employ radio technologies. The radio technology employed may be configured based on factors such as power consumption, data rate, and distance. For example, for short distances such as a few meters, a wireless communication device may employ a wireless technology such as Bluetooth. If the animal monitoring station is to be placed within several miles of a cellular communications antenna, then a cellular communications technology may be employed. For remote locations out of range of a terrestrial receiver, satellite communications technology may be employed. For distances up to approximately 10 kilometers, a longer range technology (e.g. Long Range (LoRa)) may be employed. It is envisioned that yet other wireless technologies may be employed to communicate information to and from the animal monitoring station.

The observation chamber (e.g. 1220) may comprise a bait receptacle (e.g. 1250). The bait receptacle (e.g. 1250) may be configured to lure an animal visitor to the observation chamber. The bait receptacle (e.g. 1250) may be mounted to one or more walls (e.g. 1226) of the observation chamber (e.g. 1220). The bait receptacle (e.g. 1250) may be removable. The bait receptacle (e.g. 1250) may be refillable. The bait receptacle (e.g. 1250) may be self-filling.

The observation chamber (e.g. 1220) may comprise a one or more cameras (e.g. 1260). The camera (e.g. 1260) may be configured and/or positioned to have a field of view of a visiting animal in front of one or more grids (e.g. 1282). The camera (e.g. 1260) may be mounted to a support (e.g. 1261). The support (e.g. 1261) may be mounted to one or more walls (e.g. 1226). The support (e.g. 1261) may be mounted to cap (e.g. 1230). The support (e.g. 1261) may be mounted to a floor of the observation chamber. The camera(s) (e.g. 1260) may be configured to capture an image of a visiting animal when triggered by an external sensor. The image may comprise one or more still images, and/or one or more moving images. The external sensor may comprise a scale. The external sensor may comprise a motion sensor. The external sensor may comprise a microphone. The external sensor may comprise a vibration sensor. The external sensor may comprise image recognition software operating on an image captured by one or more cameras (e.g. 1260).

The animal monitoring station may further comprise a light (e.g. 1262) disposed inside the observation chamber (e.g. 1220). The light (e.g. 1262) may comprise a light emitting diode (LED). The light (e.g. 1262) may emit infrared radiation. The light (e.g. 1262) may emit radiation configured to not disturb the animal (e.g. 1229). The animal monitoring station may further comprise a light sensor (e.g. 1263). The animal monitoring station may further comprise a circuit configured to activate a light (e.g. 1262) disposed in the observation chamber (e.g. 1220) in response to a light measurement (e.g. via light sensor 1263) being less than a threshold. The animal monitoring station may comprise a daylight sensor employed to determine when to activate the light (e.g. 122). The LED lighting system may be coupled with an analog-to-digital photoresistor for monitoring the ambient lighting within the observation chamber (e.g. 1220) such that the monitoring system may trigger infrared lighting to compensate for proper exposure during periods of inefficient light levels.

Figure 13:
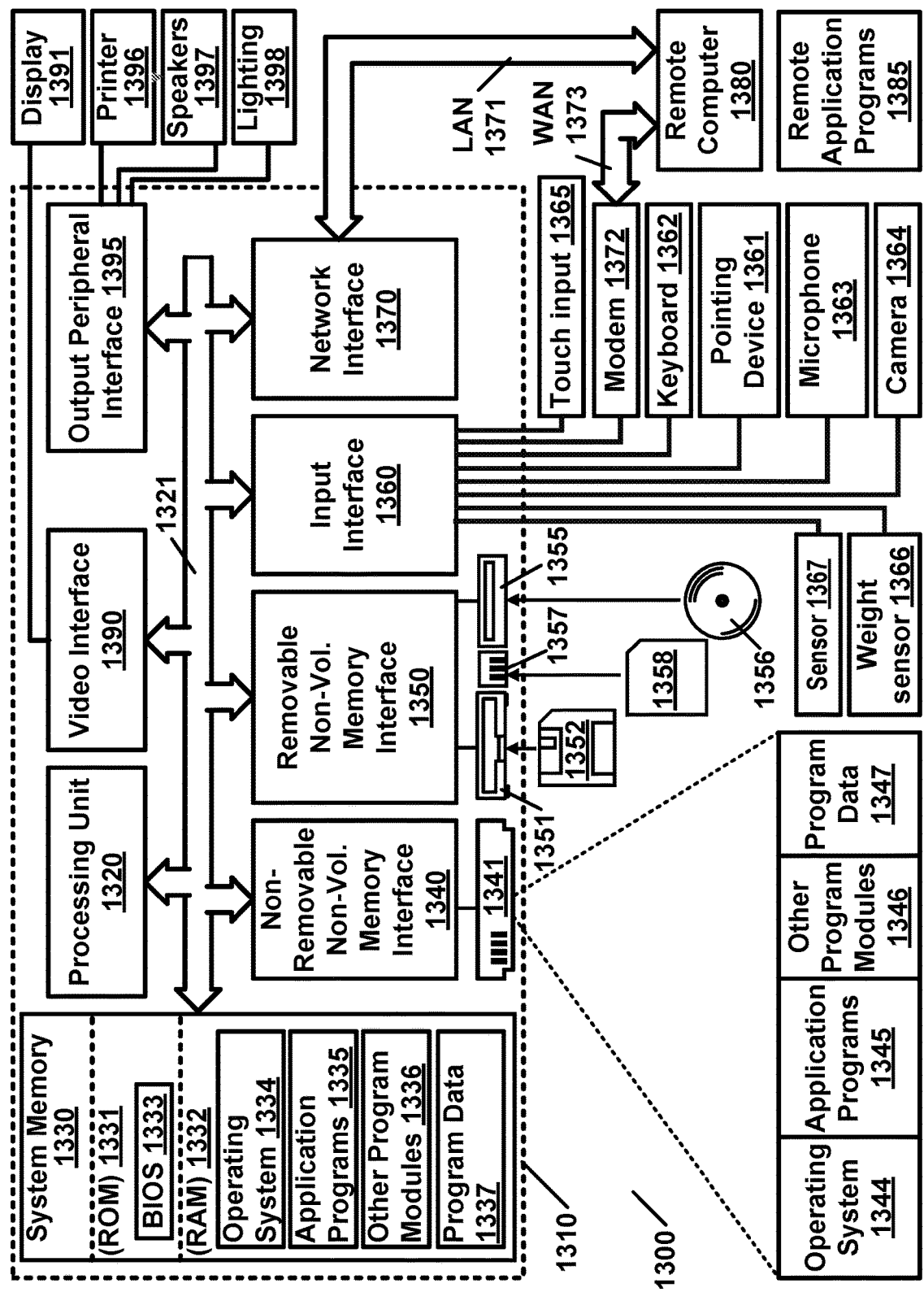
FIG. 13 illustrates an example of a computing system environment on which aspects of some embodiments may be implemented.

FIG. 13 illustrates an example of a suitable computing system environment 1300 on which aspects of some embodiments may be implemented. The computing system environment 1300 is only one example of a suitable computing environment and is not intended to suggest any limitation as to the scope of use or functionality of the claimed subject matter. For example, the computing environment could be an analog circuit. Neither should the computing environment 1300 be interpreted as having any dependency or requirement relating to any one or combination of components illustrated in the operating environment 1300.

Embodiments are operational with numerous other general purposes or special purpose computing system environments or configurations. Examples of well-known computing systems, environments, and/or configurations that may be suitable for use with various embodiments include, but are not limited to, embedded computing systems, personal computers, server computers, hand-held or laptop devices, smart phones, smart cameras, tablets, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 13, an example system for implementing some embodiments includes a general-purpose computing device in the form of a computer 1310. Components of computer 1310 may include, but are not limited to, a processing unit 1320, a system memory 1330, and a system bus 1321 that couples various system components including the system memory to the processing unit 1320. An example embodiment of a computing device includes a Raspberry Pi 3 Microcomputer.

Computer 1310 typically includes a variety of computer readable media. Computer readable media can be any available media that can be accessed by computer 1310 and includes both volatile and nonvolatile media, and removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 1330 includes computer storage media in the form of volatile and/or nonvolatile memory such as ROM 1331 and RAM 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, a flash drive reader 1357 that reads flash drive 1358, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media discussed above and illustrated in FIG. 13 provide storage of computer readable instructions, data structures, program modules and other data for the computer 1310. In FIG. 13, for example, hard disk drive 1341 is illustrated as storing operating system 1344, application programs 1345, program data 1347, and other program modules 1346. Additionally, for example, non-volatile memory may include instructions to, for example, discover and configure IT device(s); the creation of device neutral user interface command(s); combinations thereof, and/or the like.

Commands and information may be entered into the computing hardware 1310 through input devices such as a keyboard 1362, a microphone 1363, a camera 1364 (e.g. 860, 960, 1160, and/or 1260), a weight sensor 1366 (e.g., 870, 970 and/or 1270) and sensors 1367. These and other input devices are often connected to the processing unit 1320 through an input interface 1360 that is coupled to the system bus, but may be connected by other interface and bus structures, such as a parallel port, game port or a universal serial bus (USB). A display 1391 may also be connected to the system bus 1321 via an interface, such as a video interface 1390. Other devices, such as, for example, speakers 1397, printer 1396 and network switch(es) 1398 and lighting controls 1398 may be connected to the system via peripheral interface 1395.

The computer 1310 is operated in a networked environment using logical connections to one or more remote computers, such as a remote computer 1380. The remote computer 1380 may be a personal computer, a hand-held device, a server, a router, a network PC, a peer device or other common network node, and typically includes many or all of the elements described above relative to the computer 1310. The logical connections depicted in FIG. 13 include a local area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360, or other appropriate mechanism. The modem 1372 may be wired or wireless. Examples of wireless devices may comprise, but are limited to: Wi-Fi and Bluetooth. In a networked environment, program modules depicted relative to the computer 1310, or portions thereof, may be stored in the remote memory storage device. By way of example, and not limitation, FIG. 13 illustrates remote application programs 1385 as residing on remote computer 1380. It will be appreciated that the network connections shown are exemplary and other means of establishing a communications link between the computers may be used. Additionally, for example, LAN 1371 and WAN 1373 may provide a network interface to communicate with other distributed infrastructure management device(s); with IT device(s); with users remotely accessing the User Input Interface 1360; combinations thereof, and/or the like.

In the figures, like reference numerals may identify like elements. For example, element 130 in FIG. 1, element 230 in FIG. 2, element 330 in FIG. 3, element 430 in FIG. 4, element 830 in FIG. 8, element 1030 in FIG. 10, and element 1230 in FIG. 12 all represent various embodiments of a cap.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to." The abbreviation "e.g." means "for example" and is followed by one or more examples that illustrate a term receding the abbreviation.

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on collecting data on small mammals. However, one skilled in the art will recognize that embodiments of the invention may also be implemented in a system configured to collect data on other types of animals, such as for example, bird, bats and/or amphibians. Embodiments may be applicable to studies by other researchers and students on eutherians and Metatherians at the low end of the mammalian size spectrum as well as other types of animals.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A device comprising: a) a housing unit located in a natural habitat comprising: i) a chamber; and ii) at least one port having dimensions to restrict access to the chamber of the housing unit based on a size of an animal, and the at least one port configured to allow an animal of a desired size: (1) random ingress to the chamber; and (2) random egress from the chamber, b) a bait receptacle disposed inside the chamber; c) a camera disposed in the chamber, the camera having an associated field of view; d) a scale disposed in the field of view; e) a visual sizing wall grid surface, being a physical grid surface with a first
pattern configured to assist in determining measurements of the animal in front of the visual sizing wall grid surface, the visual sizing wall grid surface being disposed in the field of view and having a substantially vertical orientation; f) a scale grid surface, being a physical grid surface with a second pattern configured to assist in determining measurements of the animal on the scale, the scale grid surface being disposed on an upper surface of the scale, the scale grid surface having a substantially horizontal orientation; and g) one or more sensors, operably coupled to the scale, the sensors configured to generate a trigger based, at least in part, on a presence of the animal on the scale while the animal is ambulatory, h) where the trigger activates generation of a representation of at least one body measurement of the animal relative to the visual sizing wall grid surface and the scale grid surface, the representation being an image that is streamed to a receiving location; i) where the trigger is based at least in part on a weight measurement threshold.

2. The device of claim 1 further comprising:
a) one or more processors; and
b) one or more memories, operatively coupled to one or more of the one or more processors, the one or more memories configured to store one or more instructions that when executed by the one or more processors, cause the device, in response to the trigger:
to measure, utilizing the scale, a weight quantity
ii).

3. The device of claim 2, further comprising a first wireless device configured to communicate the weight quantity and the image to a second wireless device.

4. The device of claim 2, further comprising a storage device configured to store: the weight quantity and the image.

5. The device of claim 2, where the trigger is based at least in part on a detected motion.

6. The device of claim 2, where the trigger is based at least in part on a detected sound.

7. The device of claim 2, where the trigger is based at least in part on a detected vibration.

8. The device of claim 1, where the housing further comprises a cap.

9. The device of claim 1, where the housing further comprises an insulated cap.

10. The device of claim 1 where the housing further comprises a cap shaped to shed falling precipitation.

11. The device of claim 1 where at least a portion of the housing is translucent.

12. The device of claim 1, where a size of the at least one port is based on the size of the animal.

13. The device of claim 1 where the bait receptacle is removable.

14. The device of claim 1, where the scale comprises a load cell.

15. The device of claim 14, where the load cell is mounted between a base of the housing and a scale plate.

16. The device of claim 1, where the housing further comprises an external support structure.

17. The device of claim 1, further comprising an illumination source in the chamber, configured to activate in response to a light sensor.

18. The device of claim 1, where the image is a still image.

19. The device of claim 1, where the image is a moving image.

* * * * *